(No Model.)

J. W. PACKARD.
ELECTRICAL CONVERTER.

No. 527,070. Patented Oct. 9, 1894.

Witnesses
John Brune
Wm. S. Dodge.

Inventor
James Ward Packard,
By _____
Attorney

THE NORRIS PETERS CO., PHOTO-LITHO., WASHINGTON, D. C.

UNITED STATES PATENT OFFICE.

JAMES WARD PACKARD, OF WARREN, OHIO.

ELECTRICAL CONVERTER.

SPECIFICATION forming part of Letters Patent No. 527,070, dated October 9, 1894.

Application filed January 3, 1894. Serial No. 495,548. (No model.)

*To all whom it may concern:*

Be it known that I, JAMES WARD PACKARD, of Warren, in the county of Trumbull and State of Ohio, have invented certain new and useful Improvements in Electrical Converters; and I do hereby declare the following to be a full, clear, and exact description of the invention, such as will enable others skilled in the art to which it appertains to make and use the same.

This invention contemplates new and useful improvements in electrical converters or transformers and has for its object the production of improved, simple and highly efficient means for the transformation of electrical energy in the form of alternate currents.

The invention consists of a converter having primary and secondary coils of wire and a series of plates encompassing both of said coils and arranged in such manner that they will fit snugly together and form inner and outer rings presenting even surfaces, the entire series of plates forming a compact, nearly solid mass.

The invention also comprises the details of construction, combination and arrangement of parts, substantially as hereinafter fully set forth and particularly pointed out in the claims.

Figure 1:
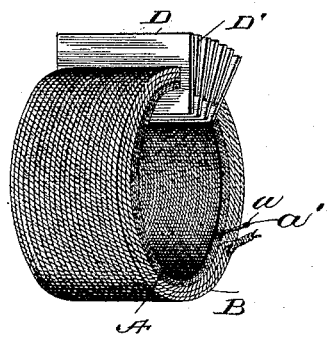
Figure 2:
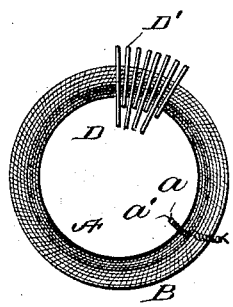
Figure 3:
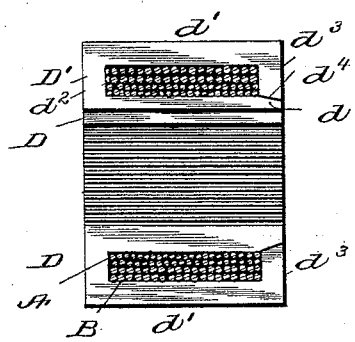
Figure 4:
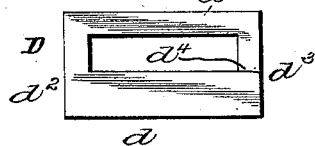
Figure 5:
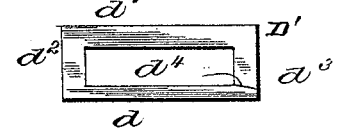
Figure 6:
Figure 7:
Figure 8:
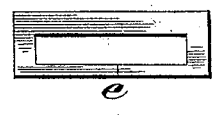

In the accompanying drawings: Figure 1 is a view in perspective showing but a portion of the encompassing plates forming the magnetic field. Fig. 2 is a diagrammatical end view. Fig. 3 is a transverse sectional view. Figs. 4 and 5 are views of the two forms of plates. Figs. 6, 7 and 8 are views of modified forms of the latter.

Refering to the drawings, A represents the primary coil composed of a considerable number of turns of comparatively fine wire, its ends, $a$ and $a'$, extending out from the coil and connected with the high pressure mains.

B is the secondary coil composed of a lesser number of turns of larger wire, its ends being brought out in a like manner and connected with the low pressure mains or translating devices in which the electric energy is used. This coil may be wound concentric with the primary and placed either within, as shown in the drawings, or inclosing the primary; or the coils may be placed side by side. Whichever method is followed the iron core built up of plates of the form shown in Figs. 4, 5, 6, 7 or 8 and whose function is to carry the magnetic lines of force (that are created by the current in the one coil) through the convolutions of the other; surrounds the coils on all sides forming a compact and closely packed iron ring, composed of plates D and D′ consisting each of inner and outer portions $d$ and $d'$ and end pieces $d^2$ and $d^3$; the former being made integral with the ends of portions $d$, $d'$ at one end thereof, while the latter, $d^3$, is integral with the outer portion, $d'$, and has its free end, $d^4$, preferably beveled to conform to a seat against the inner portion, $d$. This latter portion of the plate D is made about three times as wide as the corresponding portion of plate D′. The cylinder or double ring is made up by alternating the plates D, D′, that is, between two plates D is placed one plate D′. This arrangement is observed throughout the construction of the double ring and in consequence the latter presents a solid mass having truly circular inner and outer circumferences.

In Figs. 6, 7 and 8 I have shown a slightly modified form of plates in which the outer parallel portions of plate D and the inner portions of plate D′ are split at their centers, as shown at $e$.

The advantages of my invention will be apparent to those skilled in the art to which it appertains and it will be specially observed that by arranging the plates alternately so that one having a narrow inner portion will be located between two of the plates having widened inner portions, I obtain a double ring with even inner and outer circumferences, all of the plates fitting snugly together without having intervening spaces.

The method of construction and form of plates do away with all bolts and fastening devices, thereby not only cheapening the cost of manufacture but greatly increasing the electrical efficiency by presenting a practically uniform and uninterrupted magnetic circuit; and so reducing the amount of energy required for magnetizing to a minimum.

As has already been noted, I do not confine myself to any special arrangement or number of coils. This invention is equally applicable to the transforming of a high potential small current to a low potential large current or vice versa.

I claim as my invention—

1. A converter having a primary coil, a secondary coil, and a cylinder or double ring enclosing both of said coils and composed of alternately arranged plates having their inner portions of unequal width, as set forth.

2. A converter having a primary coil and a secondary coil, and a series of plates inclosing said coils and consisting each of inner and outer parallel portions and corresponding end portions, the inner portions of each alternate plate being of greater width than the inner portions of the next adjacent plates, substantially as set forth.

3. The herein-described improved converter, consisting of the primary coil and the secondary coil surrounding said primary coil, and the cylinder or double ring inclosing both of said coils and consisting of two sets of plates having inner and outer parallel portions connected together at one end and split at the other, the said inner portion of one set of plates being of greater width than the inner portion of the other set, substantially as set forth.

In testimony whereof I have signed this specification in the presence of two subscribing witnesses.

JAMES WARD PACKARD.

Witnesses:
GEO. W. UPTON,
I. H. MERRILL.